US010444577B2

(12) United States Patent
Song et al.

(10) Patent No.: US 10,444,577 B2
(45) Date of Patent: Oct. 15, 2019

(54) POLYMER STABILIZATION VERTICAL ALIGNMENT (PSVA) LIQUID CRYSTAL DISPLAY PANEL

(71) Applicant: Shenzhen China Star Optoelectronics Semiconductor Display Technology Co., Ltd., Shenzhen (CN)

(72) Inventors: Yanjun Song, Shenzhen (CN); Yongchao Zhao, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 47 days.

(21) Appl. No.: 15/579,976

(22) PCT Filed: Nov. 10, 2017

(86) PCT No.: PCT/CN2017/110317
§ 371 (c)(1),
(2) Date: Dec. 6, 2017

(87) PCT Pub. No.: WO2019/075806
PCT Pub. Date: Apr. 25, 2019

(65) Prior Publication Data
US 2019/0155084 A1  May 23, 2019

(30) Foreign Application Priority Data
Oct. 18, 2017 (CN) ............ 2017 1 0978347

(51) Int. Cl.
*H01L 27/14* (2006.01)
*G02F 1/1345* (2006.01)
(Continued)

(52) U.S. Cl.
CPC .......... *G02F 1/13452* (2013.01); *G02F 1/137* (2013.01); *G02F 1/13458* (2013.01); *G02F 1/134309* (2013.01); *G02F 1/1368* (2013.01); *G02F 1/13454* (2013.01); *G02F 2001/13775* (2013.01)

(58) Field of Classification Search
CPC ... H01L 33/08; G02F 1/13452; G02F 1/13454
See application file for complete search history.

(56) References Cited

U.S. PATENT DOCUMENTS

2009/0321013 A1* 12/2009 Pitault ................ H01L 23/544
156/305
2017/0146567 A1* 5/2017 Yue ....................... G02F 1/1309

* cited by examiner

*Primary Examiner* — Phuc T Dang
(74) *Attorney, Agent, or Firm* — Mark M. Friedman

(57) ABSTRACT

A polymer stabilization vertical alignment (PSVA) liquid crystal display panel is provided and has an array substrate. A driver circuit is disposed on a side of the array substrate, and at least two alignment modules close to an edge of the array substrate are disposed on the side of the array substrate facing the color filter substrate. Each alignment module has at least two alignment lines. An input terminal of each alignment line is connected to a metal contact pad, and an output terminal of the alignment line is connected to the driver circuit; the metal contact pads belonging to the same alignment module are in short connection. A set of the metal contact pads in short connection is connected to a probe bar through a probe pin.

18 Claims, 3 Drawing Sheets

(51) Int. Cl.
*G02F 1/137* (2006.01)
*G02F 1/1343* (2006.01)
*G02F 1/1368* (2006.01)

POLYMER STABILIZATION VERTICAL ALIGNMENT (PSVA) LIQUID CRYSTAL DISPLAY PANEL

FIELD OF INVENTION

The present invention relates to fields of manufacture of display panels, especially to a polymer stabilization vertical alignment (PSVA) liquid crystal display panel.

BACKGROUND OF INVENTION

In polymer stabilization vertical alignment (PSVA) technologies, it is necessary to add chemical monomers into liquid crystals. During an alignment process, the chemical monomers irradiated by ultraviolet light are polymerized into polymer bumps for curing the liquid crystals to form a pre-tilted angle. A PSVA process comprises: applying a series of voltages to a substrate such that the liquid crystals are tilted under an electric field in order; keeping the voltage constant and simultaneously applying ultraviolet light on the liquid crystals to polymerize the chemical monomers; and curing the liquid crystals to form a pre-tilted angle.

With respect to PSVA products, an alignment process generally has two methods: A. Array probe curing (alignment circuit on a side of an array substrate), wherein a curing pad (metal contact pad) is designed on a side of an array (array substrate), a power-up pin contacts the curing pad to power up a display panel for alignment; and B. Color filter (CF) probe curing (alignment circuit on a side of a color filter substrate). Because the power-up pin directly contacts the CF substrate, the side of the array is designed without any curing pad. Signals on the side of the array pass through gold (Au) dots and are directed to the array.

With generation progression of product lines from the $6^{th}$ generation to the $8.5^{th}$ generation, and then further to the $10.5^{th}$ generation, each substrate may accommodate more and more display panels. With respect to the method of array probe curing, each display panel has a set of curing pads. Especially, to gate-on-array (GOA) products, the number of curing pads would be greater.

Furthermore, when alignment is implemented, curing pads with the same signals are designed from connecting to one another to prevent issues of missing array inspection and quality downgrade.

With respect to the above issues, fixtures of probe bars needed for inspection have been required in high standards. Excessively long and large probe bars easily result in poor contact between a pin of the probe bar and a curing pad, which causes poor alignment and downgrade of screen quality.

As described above, in the conventional PSVA display panel, the liquid crystal motherboard comprises more and more panels, alignment circuit needs more curing pads, and each curing pad needs to be connected to a probe bar through a corresponding pin such that the number of pins increases, which raises the risk of poor contact between the pins and the curing pads.

SUMMARY OF INVENTION

The present invention provides a polymer stabilization vertical alignment (PSVA) liquid crystal display panel in which an alignment circuit on a side of an array substrate arranges curing pads of a same signal into one set to connect one pin such that the number of the pins is reduced and the connection between the curing pads and probe bars. Therefore, technologic issues of each curing pad needing to be connected to a probe bar through a corresponding pin causing an increased number of the pins and raising the risk of poor contact between the pins and the curing pads are solved.

To solve the abovementioned issues, the present invention provides technologic solutions as follows.

The present invention provides a PSVA liquid crystal display panel comprising:
- a color filter substrate comprising a first glass substrate and a common electrode layer prepared on a side of the first glass substrate;
- an array substrate disposed opposite to the color filter substrate, wherein a driver circuit is disposed on a side of the array substrate facing the color filter substrate, and at least two alignment modules close to an edge of the array substrate are disposed on the side of the array substrate facing the color filter substrate;
- each of the alignment modules comprising at least two alignment lines, an input terminal of each of the alignment lines connected to a metal contact pad, and an output terminal of each of the alignment lines connected to the driver circuit, wherein the alignment lines belonging to a corresponding of the alignment modules are lines of a same signal; and
- a probe bar located on a side of the array substrate, wherein at least two probe pins are disposed on a side of the probe bar, and each of the probe pins is connected to and contact a corresponding one of the metal contact pads;
- wherein two of the metal contact pads belonging to a corresponding one of the alignment modules are connected to each other through conductive gold balls, and the two metal contact pads are connected to the common electrode layer through conductive gold balls; each of the probe pins contacts and is connected to one of the metal contact pads of a corresponding one of the alignment modules; and common electrode regions corresponding to the metal contact pads of different signals are insulated from each other or one another.

According to a preferred embodiment of the present invention, the common electrode layer is patterned to form at least two of the common electrode regions, the common electrode regions are connected respectively to the metal contact pads.

According to a preferred embodiment of the present invention, a width of an interval of adjacent two of the common electrode regions is 30 um to 300 um.

According to a preferred embodiment of the present invention, the driver circuit comprises data lines, scan lines and common lines.

According to a preferred embodiment of the present invention, the data lines comprise red sub-data lines, green sub-data lines and blue sub-data lines.

According to a preferred embodiment of the present invention, a data signal alignment module, a scan signal alignment module and a common signal alignment module are disposed on a surface of the array substrate;
- the data signal alignment module comprises at least two data signal alignment lines, and the data signal alignment lines are connected to the data lines;
- the scan signal alignment module comprises at least two scan signal alignment lines, and the scan signal alignment lines are connected to the scan lines; and the common signal alignment module comprises at least two common signal alignment lines, and the common signal alignment lines are connected to the common lines.

According to a preferred embodiment of the present invention, the data signal alignment module comprises red pixel alignment modules, green pixel alignment modules, and blue pixel alignment modules.

According to a preferred embodiment of the present invention, a thickness of the common electrode layer is 200 Å to 1500 Å.

According to a preferred embodiment of the present invention, electrode material of the common electrode layer is one of indium tin oxide (ITO) and indium zinc oxide (IZO).

The present invention further provides a PSVA liquid crystal display panel comprising:
- a color filter substrate comprising a first glass substrate and a common electrode layer prepared on a side of the first glass substrate;
- an array substrate disposed opposite to the color filter substrate, wherein a driver circuit is disposed on a side of the array substrate facing the color filter substrate, and at least two alignment modules close to an edge of the array substrate are disposed on the side of the array substrate facing the color filter substrate;
- each of the alignment modules comprising at least two alignment lines, an input terminal of each of the alignment lines connected to a metal contact pad, and an output terminal of each of the alignment lines connected to the driver circuit, wherein the alignment lines belonging to a corresponding one of the alignment modules are lines of a same signal; and
- a probe bar located on a side of the array substrate, wherein at least two probe pins are disposed on a side of the probe bar, and each of the probe pins is connected to and contact a corresponding one of the metal contact pads;
- wherein two of the metal contact pads belonging to a corresponding one of the alignment modules are connected to each other through conductive gold balls, and the two metal contact pads are connected to the common electrode layer through conductive gold balls; and each of the probe pins contacts and is connected to one of the metal contact pads of a corresponding one of the alignment modules.

According to a preferred embodiment of the present invention, the common electrode layer is patterned to form at least two of the common electrode regions, the common electrode regions are connected respectively to the metal contact pads.

According to a preferred embodiment of the present invention, a width of an interval of adjacent two of the common electrode regions is 30 um to 300 um.

According to a preferred embodiment of the present invention, the driver circuit comprises data lines, scan lines and common lines.

According to a preferred embodiment of the present invention, the data lines comprise red sub-data lines, green sub-data lines and blue sub-data lines.

According to a preferred embodiment of the present invention, a data signal alignment module, a scan signal alignment module and a common signal alignment module are disposed on a surface of the array substrate;
the data signal alignment module comprises at least two data signal alignment lines, and the data signal alignment lines are connected to the data lines;

the scan signal alignment module comprises at least two scan signal alignment lines, and the scan signal alignment lines are connected to the scan lines; and the common signal alignment module comprises at least two common signal alignment lines, and the common signal alignment lines are connected to the common lines.

According to a preferred embodiment of the present invention, the data signal alignment module comprises red pixel alignment module, green pixel alignment module and blue pixel alignment module.

According to a preferred embodiment of the present invention, a thickness of the common electrode layer is 200 Å to 1500 Å.

According to a preferred embodiment of the present invention, electrode material of the common electrode layer is one of indium tin oxide (ITO) and indium zinc oxide (IZO).

Advantages of the present invention are as follows. In comparison to a conventional PSVA liquid crystal display panel, the PSVA liquid crystal display panel provided by the present invention has the alignment circuit on one side of the array substrate arranging the curing pads of a same signal into one set to connect one pin such that the number of the pins is reduced and the connection between the curing pads and probe bars. Therefore, technologic issues of each curing pad needing to be connected to a probe bar through a corresponding pin causing an increased number of the pins and raising the risk of poor contact between the pins and the curing pads are solved.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

Figure 1:
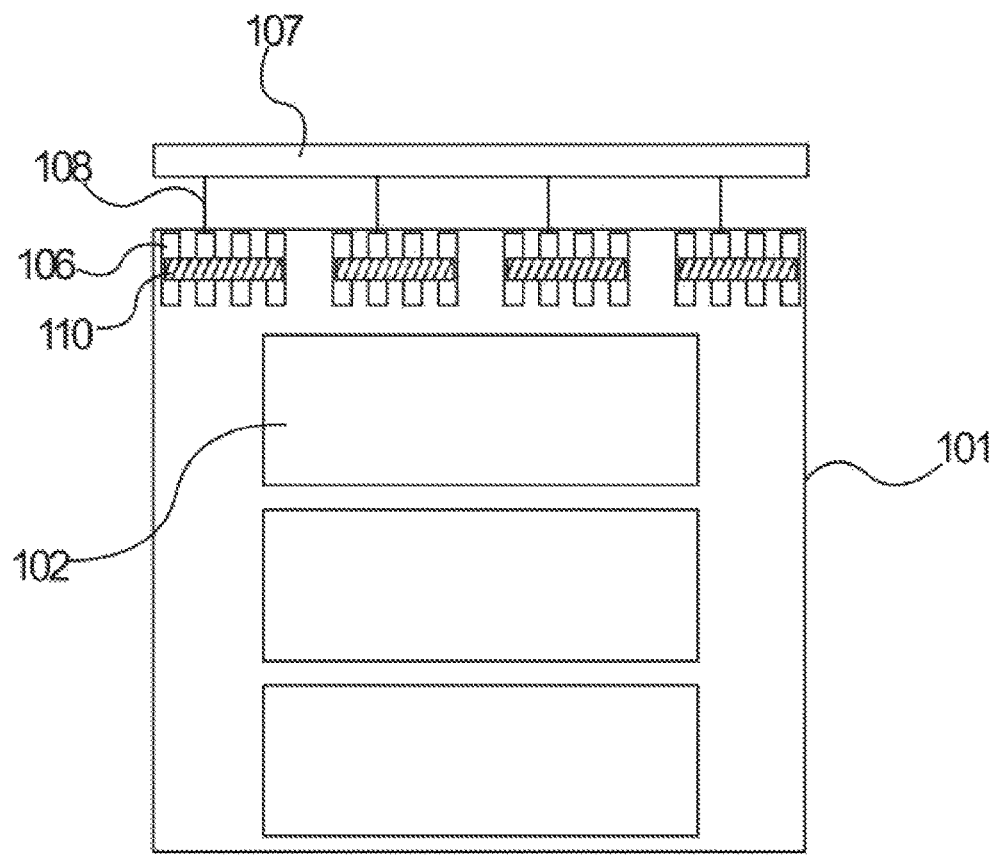
FIG. 1 is a schematic front view of a polymer stabilization vertical alignment (PSVA) liquid crystal display panel in accordance with the present invention.

Each of the following embodiments is described with appending figures to illustrate specific embodiments of the present invention that are applicable. The terminologies of direction mentioned in the present invention, such as "upper", "lower", "front", "rear", "left", "right", "inner", "outer", "side surface" and etc., only refer to the directions of the appended figures. Therefore, the terminologies of direction are used for explanation and comprehension of the present invention, instead of limiting the present invention. In the figures, units with similar structures are marked with the same reference numerals.

The present invention aims at technologic issues of a conventional polymer stabilization vertical alignment (PSVA) liquid crystal display panels that in an alignment circuit on a side of an array substrate, each curing pad needs to be connected to a probe bar through a corresponding pin such that the number of the pins is excessive and the risk of poor connection between the pins and the curing pads is increased. The present embodiment can solve the above-mentioned defects.

With reference to FIG. 1, a PSVA liquid crystal display panel provided by the present invention comprises a motherboard 101. The motherboard 101 comprises at least two sub-display panels 102.

Each of the sub-display panels 102 comprises: a color filter substrate at least comprising a first glass substrate and a common electrode layer prepared on a side of the first glass substrate; and an array substrate disposed opposite to the color filter substrate. A driver circuit, a thin film transistor (TFT) device array, and at least two alignment modules close to an edge of the array substrate are disposed on a side of the array substrate facing the color filter substrate. The driver circuit comprises data lines configured to transmit data signal to the TFT device and scan lines configured to transmit control signals to the TFT device. The scan lines and the data lines lie in different planes and intersect one another perpendicularly to form pixel units.

Each of the alignment modules comprises at least two alignment lines, an input terminal of each of the alignment lines is connected to a metal contact pad 106, and an output terminal of each of the alignment lines is connected to the driver circuit. The alignment lines belonging to a corresponding of the alignment modules are lines of a same signal.

A probe bar 107 is located on a side of the array substrate. At least two probe pins 108 are disposed on a side of the probe bar 107. Each of the probe pins 108 is connected to and contact a corresponding one of the metal contact pads 106. The probe bar 107 may input alignment signals into corresponding alignment modules through the probe pin 108.

Two of the metal contact pads 106 belonging to a corresponding one of the alignment modules are connected to each other through conductive gold balls, and the two metal contact pads 106 are connected to the common electrode layer through conductive gold balls. Each of the probe pins 108 contacts and is connected to one of the metal contact pads 106 of a corresponding one of the alignment modules.

The metal contact pads 106 are arranged abreast in a row, the metal contact pads 106 of a same signal are defined in a set, and a metal glue layer 110 is coated on surfaces of the metal contact pad 106 of each set. The conductive gold balls are distributed evenly in the metal glue layer 110 such that the metal contact pads 106 of the same signal arranged abreast in the row are electrically conductive to one another. Simultaneous electric conduction among same signal alignment lines can be achieved by merely connecting the metal contact pads 106 of the same set to one of the probe pins 108.

A particle diameter of the conductive gold ball approximates to a height of an interval between the color filter substrate and the array substrate.

During the alignment of the PSVA substrate, the probe bar 107 provides enable signals and transmits alignment signals through the probe pin 108 to an input terminal of a corresponding one of the metal contact pads 106. The alignment signals are transmitted through an output terminal of the corresponding one of the metal contact pads 106 to a connected signal alignment line. At the meantime, the metal contact pads 106 are connected to the common electrode layer through a conductive gold ball. When the probe bar 107 provides the alignment signals, a part of the signals is transmitted to the common electrode layer such that a potential difference between the common electrode layer and a pixel electrode on a side of the array substrate to cause liquid crystal molecules between the common electrode layer and the pixel electrode to form a pre-tilted angle. Finally, the liquid crystal molecules are cured by ultraviolet light to secure the deflection angle of the liquid crystals.

Figure 2A:
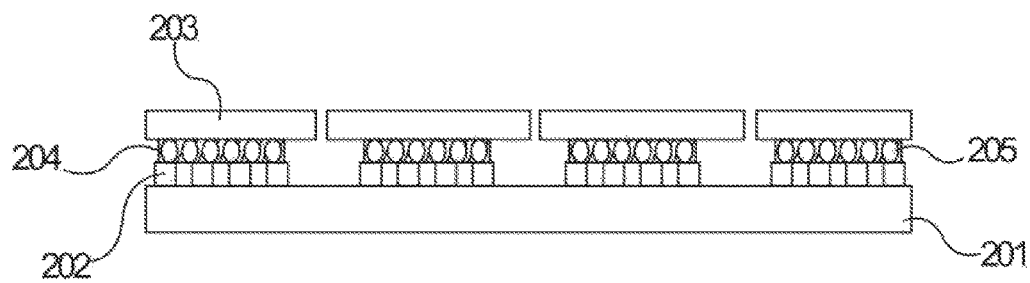
FIG. 2A is a schematic end view of the PSVA liquid crystal display panel in accordance with the present invention.
Figure 2B:
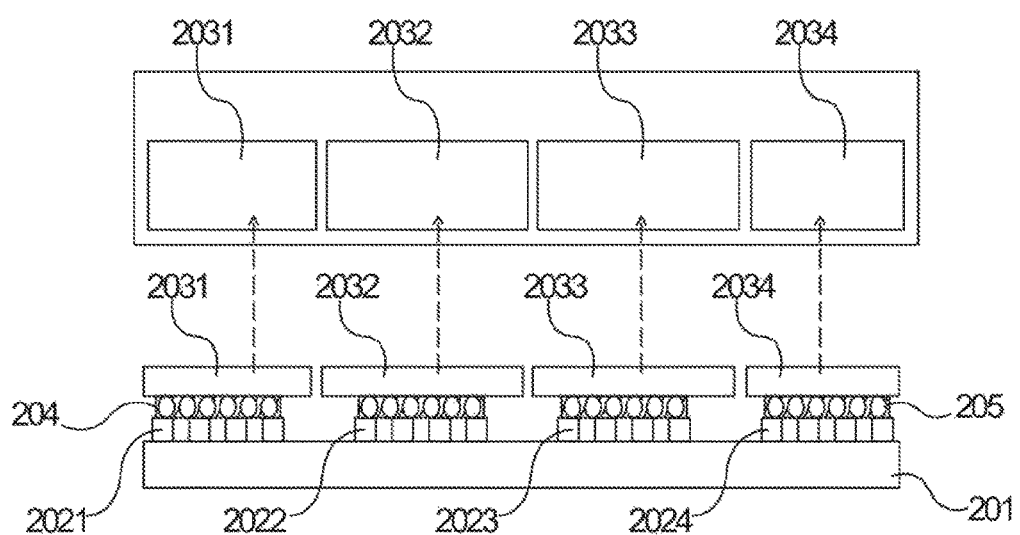
FIG. 2B is another schematic end view of the PSVA liquid crystal display panel in accordance with the present invention.

With reference to FIGS. 2A and 2B, the PSVA liquid crystal display panel of the present invention comprises: an array substrate 201; metal contact pads 202 prepared on the array substrate 201; a color filter substrate disposed opposite to the array substrate 201; a common electrode layer 203 prepared on a surface of the color filter substrate; and a metal glue layer 204 located between the metal contact pads 202 and the common electrode layer 203, wherein the metal glue layer 204 has conductive gold balls 205 distributed therein according to a specific proportion to realize electric connection between the metal contact pads 202 and the common electrode layer 203. A size of the conductive gold ball is in micron scale and corresponds to a thickness of an actual panel. A size of the metal contact pad 202 is in millimeter scale, and a surface of one metal contact pad 202 are distributed with 500 to 1000 particles of the conductive gold balls.

Because it is required to form a potential difference between the common electrode layer 203 between the pixel electrode, the common electrode layer 203 and the pixel electrode should have different voltages.

Common electrode regions corresponding to the metal contact pads 202 of different signals are insulated from each other or one another to realize separately inputting different signals. For example, the common electrode layer 203 is patterned to form at least two of the common electrode regions, and the common electrode regions are connected to corresponding the metal contact pads 202.

In the patterned common electrode region, adjacent two of the common electrode regions are at an interval. Pixel units on the surface of the array substrate 201 are disposed around the interval.

For example, the common electrode layer 203 comprises an alignment signal region 2031, a GOA signal region 2032, a data signal region 2033 and a common line signal region 2034. A side of the array substrate 201 is disposed with first metal contact pads 2021 contacting and connected to the alignment signal region 2031, second metal contact pads 2022 contacting and connected to the GOA signal region 2032, third metal contact pads 2023 contacting and connected to the data signal region 2033 and fourth metal contact pads 2024 contacting and connected to the common line signal region 2034.

For example, a width of an interval of adjacent two of the common electrode region is 30 um to 300 um.

The driver circuit comprises data lines, scan lines and common lines. The data lines comprise red sub-data lines, green sub-data lines and blue sub-data lines.

A data signal alignment module, a scan signal alignment module and a common signal alignment module are disposed on the surface of the array substrate 201. The data signal alignment module comprises at least two data signal alignment lines, and the data signal alignment line are connected to the data line. The scan signal alignment module comprises at least two scan signal alignment lines, and the scan signal alignment lines are connected to the scan line.

The common signal alignment module at least two common signal alignment lines, and the common signal alignment lines are connected to the common line.

Furthermore, the data signal alignment module comprises red pixel alignment modules, green pixel alignment modules, and blue pixel alignment modules. The red pixel alignment modules correspond to and are connected to the red sub-data lines, the green pixel alignment modules correspond to and are connected to the green sub-data lines, and the blue pixel alignment modules correspond to and are connected to the blue sub-data lines.

A thickness of the common electrode layer 203 is 200 Å to 1500 Å.

Electrode material of the common electrode layer 203 is one of indium tin oxide (ITO, Indium tin oxide semiconductor transparent conductive film) and indium zinc oxide (IZO, indium-doped zinc oxide, doped indium oxide semiconductor transparent conductive film).

Advantages of the present invention are as follows. In comparison to a conventional PSVA liquid crystal display panel, the PSVA liquid crystal display panel provided by the present invention has the alignment circuit on one side of the array substrate arranging the curing pads of a same signal into one set to connect one pin such that the number of the pins is reduced and the connection between the curing pads and probe bars. Therefore, technologic issues of each curing pad needing to be connected to a probe bar through a corresponding pin causing an increased number of the pins and raising the risk of poor contact between the pins and the curing pads are solved.

Although the preferred embodiments of the present invention have been disclosed as above, the aforementioned preferred embodiments are not used to limit the present invention. The person of ordinary skill in the art may make various of changes and modifications without departing from the spirit and scope of the present invention. Therefore, the scope of protection of the present invention is defined by the scope of the claims.

What is claimed is:

1. A polymer stabilization vertical alignment (PSVA) liquid crystal display panel, comprising:
   a color filter substrate comprising a first glass substrate and a common electrode layer prepared on a side of the first glass substrate;
   an array substrate disposed opposite to the color filter substrate, wherein a driver circuit is disposed on a side of the array substrate facing the color filter substrate, and at least two alignment modules, close to an edge of the array substrate, disposed on the side of the array substrate facing the color filter substrate;
   each of the alignment modules comprising at least two alignment lines, an input terminal of each of the alignment lines connected to a metal contact pad, and an output terminal of each of the alignment lines connected to the driver circuit, wherein the alignment lines belonging to a corresponding one of the alignment modules are lines of a same signal; and
   a probe bar located on a side of the array substrate, wherein at least two probe pins are disposed on a side of the probe bar, and each of the probe pins is connected to and contact a corresponding one of the metal contact pads;
   wherein two of the metal contact pads belonging to a corresponding one of the alignment modules are connected to each other through conductive gold balls, and the two metal contact pads are connected to the common electrode layer through conductive gold balls; each of the probe pins contacts and is connected to one of the metal contact pads of a corresponding one of the alignment modules; and common electrode regions corresponding to the metal contact pads of different signals are insulated from each other or one another.

2. The PSVA liquid crystal display panel as claimed in claim 1, wherein the common electrode layer is patterned to form at least two of the common electrode regions, the common electrode regions are connected respectively to the metal contact pads.

3. The PSVA liquid crystal display panel as claimed in claim 2, wherein a width of an interval of adjacent two of the common electrode regions is 30 um to 300 um.

4. The PSVA liquid crystal display panel as claimed in claim 1, wherein the driver circuit comprises data lines, scan lines and common lines.

5. The PSVA liquid crystal display panel as claimed in claim 4, wherein the data lines comprise red sub-data lines, green sub-data lines and blue sub-data lines.

6. The PSVA liquid crystal display panel as claimed in claim 1, wherein a data signal alignment module, a scan signal alignment module and a common signal alignment module are disposed on a surface of the array substrate;
   the data signal alignment module comprises at least two data signal alignment lines, and the data signal alignment lines are connected to the data lines;
   the scan signal alignment module comprises at least two scan signal alignment lines, and the scan signal alignment lines are connected to the scan lines; and
   the common signal alignment module comprises at least two common signal alignment lines, and the common signal alignment lines are connected to the common lines.

7. The PSVA liquid crystal display panel as claimed in claim 6, wherein the data signal alignment module comprises red pixel alignment modules, green pixel alignment modules, and blue pixel alignment modules.

8. The PSVA liquid crystal display panel as claimed in claim 1, wherein a thickness of the common electrode layer is 200 Å to 1500 Å.

9. The PSVA liquid crystal display panel as claimed in claim 1, wherein electrode material of the common electrode layer is one of indium tin oxide (ITO) and indium zinc oxide (IZO).

10. A polymer stabilization vertical alignment (PSVA) liquid crystal display panel, comprising:
    a color filter substrate comprising a first glass substrate and a common electrode layer prepared on a side of the first glass substrate;
    an array substrate disposed opposite to the color filter substrate, wherein a driver circuit is disposed on a side of the array substrate facing the color filter substrate, and at least two alignment modules close to an edge of the array substrate are disposed on the side of the array substrate facing the color filter substrate;
    each of the alignment modules comprising at least two alignment lines, an input terminal of each of the alignment lines connected to a metal contact pad, and an output terminal of each of the alignment lines connected to the driver circuit, wherein the alignment lines belonging to a corresponding one of the alignment modules are lines of a same signal; and
    a probe bar located on a side of the array substrate, wherein at least two probe pins are disposed on a side of the probe bar, and each of the probe pins is connected to and contact a corresponding one of the metal contact pads;

wherein two of the metal contact pads belonging to a corresponding one of the alignment modules are connected to each other through conductive gold balls, and the two metal contact pads are connected to the common electrode layer through conductive gold balls; and each of the probe pins contacts and is connected to one of the metal contact pads of a corresponding one of the alignment modules.

11. The PSVA liquid crystal display panel as claimed in claim 10, wherein the common electrode layer is patterned to form at least two of the common electrode regions, the common electrode regions are connected respectively to the metal contact pads.

12. The PSVA liquid crystal display panel as claimed in claim 11, wherein a width of an interval of adjacent two of the common electrode regions is 30 um to 300 um.

13. The PSVA liquid crystal display panel as claimed in claim 10, wherein the driver circuit comprises data lines, scan lines and common lines.

14. The PSVA liquid crystal display panel as claimed in claim 13, wherein the data lines comprise red sub-data lines, green sub-data lines and blue sub-data lines.

15. The PSVA liquid crystal display panel as claimed in claim 13, wherein a data signal alignment module, a scan signal alignment module and a common signal alignment module are disposed on a surface of the array substrate;

the data signal alignment module comprises at least two data signal alignment lines, and the data signal alignment lines are connected to the data lines;

the scan signal alignment module comprises at least two scan signal alignment lines, and the scan signal alignment lines are connected to the scan lines; and the common signal alignment module comprises at least two common signal alignment lines, and the common signal alignment lines are connected to the common lines.

16. The PSVA liquid crystal display panel as claimed in claim 15, wherein the data signal alignment module comprises red pixel alignment modules, green pixel alignment modules, and blue pixel alignment modules.

17. The PSVA liquid crystal display panel as claimed in claim 10, wherein a thickness of the common electrode layer is 200 Å to 1500 Å.

18. The PSVA liquid crystal display panel as claimed in claim 10, wherein electrode material of the common electrode layer is one of indium tin oxide (ITO) and indium zinc oxide (IZO).

* * * * *